(12) United States Patent
Sargent et al.

(10) Patent No.: US 11,660,840 B2
(45) Date of Patent: May 30, 2023

(54) PACKAGED FILM ASSEMBLY FOR LAMINATION BETWEEN SUBSTRATES

(71) Applicant: Solutia Canada Inc., Vancouver (CA)

(72) Inventors: Jonathan R. Sargent, Vancouver (CA); Douglas M. Wiggin, Vancouver (CA); Peter A. Von Hahn, Vancouver (CA); Simon J. Gauthier, Vancouver (CA); Ryan Gibson, Vancouver (CA); Duhane Lam, Vancouver (CA); Brodie Albright, Vancouver (CA)

(73) Assignee: Solutia Canada Inc., British Columbia (CA)

( * ) Notice: Subject to any disclaimer, the term of this patent is extended or adjusted under 35 U.S.C. 154(b) by 0 days.

(21) Appl. No.: 17/061,951

(22) Filed: Oct. 2, 2020

(65) Prior Publication Data
US 2021/0129497 A1 May 6, 2021

Related U.S. Application Data

(63) Continuation of application No. 15/970,640, filed on May 3, 2018, now abandoned.

(Continued)

(51) Int. Cl.
*B32B 17/10* (2006.01)
*G02F 1/155* (2006.01)
(Continued)

(52) U.S. Cl.
CPC .......... *B32B 17/1077* (2013.01); *B32B 3/04* (2013.01); *B32B 7/05* (2019.01); *B32B 17/10018* (2013.01); *B32B 17/10036* (2013.01); *B32B 17/10467* (2013.01); *B32B 17/10761* (2013.01); *B32B 17/10788* (2013.01); *B32B 17/10853* (2013.01); *B32B 27/08* (2013.01); *B32B 27/306* (2013.01); *B32B 27/36* (2013.01); *G02F 1/153* (2013.01); *G02F 1/155* (2013.01); *B32B 3/02* (2013.01); *B32B 3/06* (2013.01); *B32B 7/12* (2013.01); *B32B 17/10486* (2013.01); *B32B 17/10504* (2013.01); *B32B 17/10513* (2013.01); *B32B 17/10532* (2013.01);
(Continued)

(58) Field of Classification Search
None
See application file for complete search history.

(56) References Cited

U.S. PATENT DOCUMENTS 5,111,329 A * 5/1992 Gajewski .......... B32B 17/10036
359/260
5,950,830 A * 9/1999 Trigger .................. A61K 9/703
206/440

(Continued)

FOREIGN PATENT DOCUMENTS

WO WO 2021/214681 A1 10/2021

OTHER PUBLICATIONS

Trosifol Manual, 4th Edition, Kuraray Europe GmbH, Division Trosifol, 53840 Troisdorf, Germany, Nov. 2007.
(Continued)

*Primary Examiner* — Vivian Chen
(74) *Attorney, Agent, or Firm* — Michael K. Carrier

(57) ABSTRACT

A packaged film assembly includes a packaging material and a switchable film. The switchable film is packaged in and attached to at least a portion of the packaging material.

21 Claims, 10 Drawing Sheets

Related U.S. Application Data

(60) Provisional application No. 62/500,831, filed on May 3, 2017.

(51) Int. Cl.

| | | |
|---|---|---|
| *B32B 27/08* | (2006.01) | |
| *B32B 27/30* | (2006.01) | |
| *B32B 27/36* | (2006.01) | |
| *B32B 3/04* | (2006.01) | |
| *B32B 7/05* | (2019.01) | |
| *G02F 1/153* | (2006.01) | |
| *G02F 1/1334* | (2006.01) | |
| *G02F 1/01* | (2006.01) | |
| *B32B 7/12* | (2006.01) | |
| *B32B 3/06* | (2006.01) | |
| *B32B 3/02* | (2006.01) | |

(52) U.S. Cl.
CPC ....... *B32B 2329/06* (2013.01); *B32B 2331/04* (2013.01); *B32B 2553/00* (2013.01); *G02F 1/01* (2013.01); *G02F 1/1334* (2013.01)

(56) References Cited

U.S. PATENT DOCUMENTS

| | | | | |
|---|---|---|---|---|
| 6,467,621 | B1* | 10/2002 | Ishida | A61K 9/703 206/460 |
| 6,991,095 | B1 | 1/2006 | Yamasoto | A61K 9/7053 206/204 |
| 8,441,707 | B2 | 5/2013 | Lam et al. | |
| 8,927,856 | B2* | 1/2015 | Debije | H01L 31/055 136/257 |
| 2001/0030140 | A1* | 10/2001 | Mundt | B65D 75/327 206/534 |
| 2002/0118437 | A1* | 8/2002 | Rukavina | B32B 17/10045 359/275 |
| 2004/0168945 | A1* | 9/2004 | Houze | B65D 75/52 206/440 |
| 2005/0224935 | A1* | 10/2005 | Schaepkens | H01L 51/0097 257/678 |
| 2005/0227061 | A1* | 10/2005 | Slovak | B32B 17/10816 156/286 |
| 2006/0000734 | A1* | 1/2006 | Ninomiya | B29C 65/02 206/438 |
| 2006/0042985 | A1* | 3/2006 | Bucovetsky | B65D 75/32 206/466 |
| 2007/0158227 | A1* | 7/2007 | Amano | A61K 9/7061 206/438 |
| 2008/0100903 | A1* | 5/2008 | Byker | B32B 17/10174 359/288 |
| 2008/0274166 | A1* | 11/2008 | Sacks | A61K 9/703 424/449 |
| 2009/0166229 | A1* | 7/2009 | Iwao | A61L 15/24 206/204 |
| 2009/0166236 | A1* | 7/2009 | Iwao | A61F 15/001 206/438 |
| 2011/0100709 | A1* | 5/2011 | Wang | H01R 4/04 156/60 |
| 2011/0171443 | A1* | 7/2011 | Thompson | E06B 9/24 428/343 |
| 2011/0267279 | A1* | 11/2011 | Alvarez Rivera | H01L 27/3232 345/173 |
| 2012/0013969 | A1* | 1/2012 | Wang | B32B 3/02 156/313 |
| 2012/0090275 | A1* | 4/2012 | Uchida | A61K 9/7076 53/473 |
| 2012/0236393 | A1* | 9/2012 | Slovak | H01B 1/127 156/60 |
| 2012/0307337 | A1* | 12/2012 | Bartug | B32B 17/10788 359/245 |
| 2013/0143052 | A1* | 6/2013 | Neill | B32B 37/06 428/480 |
| 2013/0278989 | A1* | 10/2013 | Lam | G02B 5/208 359/275 |
| 2014/0034536 | A1* | 2/2014 | Reinhardt | A61F 13/0008 206/440 |
| 2014/0158571 | A1* | 6/2014 | Matsuoka | A61J 1/00 206/438 |
| 2014/0176836 | A1* | 6/2014 | Brecht | G02F 1/133553 349/16 |
| 2014/0354940 | A1* | 12/2014 | Lam | G02F 1/0063 351/44 |
| 2015/0036204 | A1* | 2/2015 | Branda | G02F 1/0126 359/244 |
| 2015/0116638 | A1* | 4/2015 | Zhang | G02F 1/13452 349/86 |
| 2015/0370140 | A1* | 12/2015 | Bertolini | B60J 1/001 359/275 |
| 2016/0033841 | A1* | 2/2016 | Gauthier | B23K 26/402 219/121.72 |
| 2016/0052446 | A1* | 2/2016 | Frey | B60Q 1/268 349/16 |
| 2016/0325529 | A1* | 11/2016 | Linthout | B60Q 3/208 |
| 2018/0319131 | A1 | 11/2018 | Sargent et al. | |
| 2019/0324178 | A1* | 10/2019 | Miller | G02B 5/223 |
| 2021/0129497 | A1 | 5/2021 | Sargent et al. | |

OTHER PUBLICATIONS

Bailey, Eileen, The Effect of Embossing Process Conditions on the Surface Properties of a plasticized vinyl polymer; Master's Thesis 1911, Presented to the Graduate School of the University of Massachusetts, Feb. 1984.

* cited by examiner

PACKAGED FILM ASSEMBLY FOR LAMINATION BETWEEN SUBSTRATES

This Application is a continuation of U.S. application Ser. No. 15/970,540, filed on May 3, 2018.

TECHNICAL FIELD

The present disclosure is directed at a packaged film assembly for lamination between substrates.

BACKGROUND

Conventional laminated glass comprises two glass panels between which is laminated a sheet of polyvinyl butyral ("PVB"). The PVB is laminated to the glass panels under a combination of heat and pressure and, once laminated, bonds the panels together. The PVB also acts as a protective and flexible interlayer to which glass fragments adhere should either of the panels fracture. Laminated glass is consequently commonly used in applications where safety is paramount, such as automobile windshield manufacturing.

In certain applications, laminated glass may comprise more than one interlayer. For example, FIG. 1 shows an exploded view of a prior art window assembly A prior to lamination. The assembly A comprises top and bottom glass panels B between which are three interlayers. Top and bottom PVB sheets C are the interlayers nearest the top and bottom panels B, respectively. Between the PVB sheets C are a PVB frame F and a switchable film D from which extend electrical leads E to which an electrical signal is applied to cause the switchable film D to transition from a dark state of relatively low optical transmittance to a light state of relative high optical transmittance, or vice-versa; the switchable film D comprises, for example, polyethylene terephthalate ("PET"). The PVB frame F circumscribes the switchable film D. Compared to laminating a single PVB sheet between two glass panels, manufacturing the assembly A of FIG. 1 requires cutting multiple sheets of interlayer and carefully aligning the frame F and switchable film D relative to each other and the rest of the assembly A.

Additionally, part of preparing the assembly A for lamination comprises eliminating the air bubbles between the glass panels B. Air that is trapped between the panels B during lamination can lead to one or both of optical and mechanical defects in the laminated window assembly A. Several involved techniques exist in the art for removing air bubbles as part of the overall lamination process; these include performing nip roll lamination or using a vacuum ring/bag.

Preparing and laminating the window assembly A is accordingly a time intensive process that is difficult to automate and that typically requires employing significant professional skill to perform successfully.

SUMMARY

According to a first aspect, there is provided a packaged film assembly. The packaged film assembly comprises a packaging material; and an insert film packaged in and attached to at least a portion of the packaging material, wherein the packaging material is not laminated to another surface.

According to another aspect, there is provided a packaged film assembly that comprises a packaging material comprising a first film laminable to a first substrate and a second film laminable to a second substrate, wherein each of the first and second films is translucent; and an insert film located between the first and second films, wherein the first film directly contacts a first side of the insert film and a second film directly contacts a second side of the insert film that is opposite to the first side. One or both of the first and second films may comprise polyvinyl butyral ("PVB").

According to another aspect, there is provided a packaged film assembly that comprises a packaging material comprising a first film laminable to a first substrate and a second film laminable to a second substrate; and an insert film located between the first and second films, wherein the first film directly contacts a first side of the insert film and a second film directly contacts a second side of the insert film that is opposite to the first side. The first film comprises a rough outwardly facing surface that is opposite a surface of the first film that contacts the insert film, and the second film comprises a rough outwardly facing surface that is opposite a surface of the second film that contacts the insert film. One or both of the first and second films may comprise PVB.

The following are features that may be applied to any of the foregoing aspects of the packaged film assembly.

The packaging material may comprise PVB or ethylene-vinyl acetate ("EVA").

The insert film may be a switchable film configured to switch between a dark state and a light state.

The switchable film may transition from the light state to the dark state upon exposure to sunlight and from the dark state to the light state when a voltage is applied across the switchable film absent exposure of the switchable film to sunlight.

The switchable film may comprise polyethylene terephthalate ("PET").

The packaging material may comprise a first and a second interlayer, wherein the first interlayer comprises a first film laminable to a first substrate and in direct contact with a first side of the insert film and wherein the second interlayer comprises a second film laminable to a second substrate and in direct contact with a second side of the insert film that is opposite to the first side.

The first and second films may overlap and be secured to each other at one or more overlapping portions around the insert film.

The one or more overlapping portions may comprise a single overlapping portion that circumscribes at least part of the insert film.

The single overlapping portion may circumscribe the entirety of the insert film.

The assembly may further comprise a bonding material in the overlapping portion that bonds the first and second films to each other.

The one or more overlapping portions may comprise discrete regions located around the insert film.

The discrete regions may delimit a pouch that contains the insert film.

The first film may be bonded directly to the first side of the insert film and the second film may be bonded directly to the second side of the insert film.

The first and second films may be bonded to the insert film along a periphery of the insert film to form an edge seal.

The insert film may comprise a pair of PET coverlays located between the first and second films, wherein one of the PET coverlays is secured to the first film and the other of the PET coverlays is secured to the second film; a pair of electrically conductive electrodes located between the PET coverlays, wherein one of the electrodes is secured to one of the PET coverlays and the other of the electrodes is secured to the other of the PET coverlays, and wherein each of the electrodes comprises an overhanging portion that extends past an edge of the other of the electrodes; a pair of bus bars, wherein one of the bus bars is electrically coupled to the overhanging portion of one of the electrodes and the other of the bus bars is electrically coupled to the overhanging portion of the other of the electrodes; a switching material located between the electrodes; and an epoxy between and bonding the PET coverlays to each other.

The packaging material may comprise a frame that extends around at least a portion of the insert film.

The packaging material may circumscribe the entirety of the insert film.

The frame may comprise de-airing channels extending from an interior edge to an exterior edge of the frame.

The frame may comprise tabs extending towards the insert film, and the insert film may be attached to the tabs.

The packaging material may further comprise a first film laminable to a first substrate and in direct contact with a first side of the frame and a second film laminable to a second substrate and in direct contact with a second side of the frame that is opposite to the first side.

The assembly may further comprise a pair of bus bars located between the first and second films, wherein one of the bus bars is attached to the first film and the other of the bus bars is attached to the second film; a pair of PET substrates located between the first and second films, wherein one of the PET substrates is secured to the first film and the other of the PET substrates is secured to the second film, and wherein each of the PET substrates comprises an overhanging portion that extends past an edge of the other of the PET substrates; a pair of electrical coatings located between the PET substrates, wherein one of the electrical coatings is on one of the PET substrates and the other of the electrical coatings is on the other of the PET substrates; and a switching material located between the electrical coatings.

According to another aspect, there is provided a method for manufacturing a packaged film assembly. The method comprises forming a packaging material; forming an insert film; and packaging the insert film in the packaging material, wherein the packaging material is not laminated to another surface and wherein packaging the insert film comprises attaching the insert film to at least a portion of the packaging material.

Forming the packaging material may comprise forming a frame; and forming first and second sheets manufactured from a laminable material, and the method may further comprise laying the first sheet on a flat surface; aligning the frame on the first sheet; aligning the insert film within the frame; aligning the second sheet on the frame and the insert film; and attaching each of the first and second sheets to opposing sides of the frame.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

Figure 1:
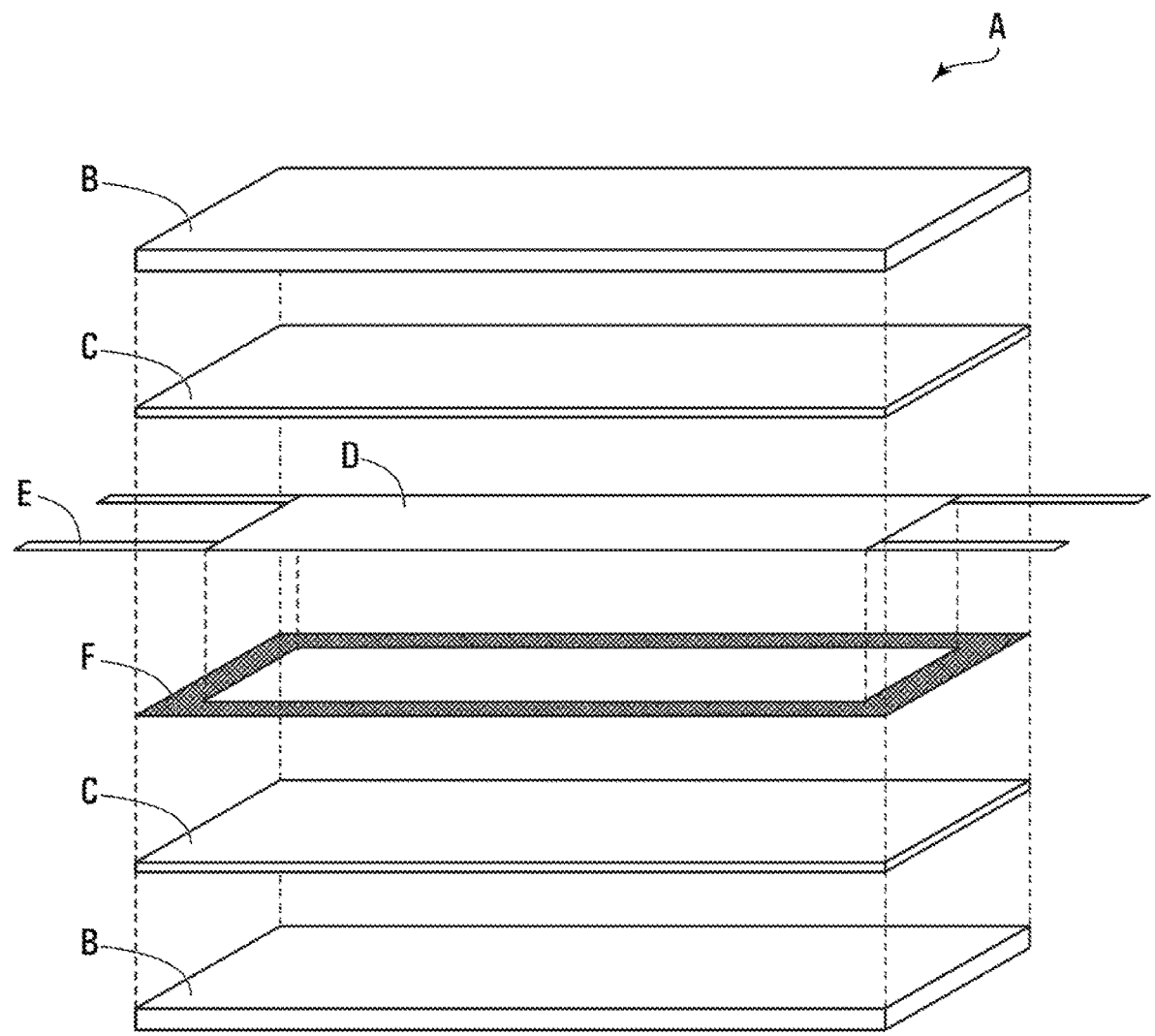
FIG. 1 is an exploded view of a laminated glass assembly, according to the prior art.

Laminating a single interlayer such as PVB between two glass panels is a relatively straightforward process. Only a single sheet of the interlayer needs to be cut to size, and a laminator can eliminate any air bubbles that may exist between the interlayer and the glass panels relatively efficiently and reliably. However, laminating multiple interlayers between glass panels is significantly more challenging. Conventionally, the laminator needs to cut and align multiple sheets of interlayer. Furthermore, removing air bubbles is more difficult for the laminator when multiple interlayer sheets are used than when only a single sheet of interlayer is used.

The embodiments described herein are directed at a packaged film assembly that allows a laminator to approach multiple interlayer lamination in a manner more similar to single interlayer lamination than is possible using conventional lamination methods. An insert film that comprises, for example, PET, is packaged using a packaging material such as PVB, ethylene-vinyl acetate ("EVA"), thermoplastic polyurethane ("TPU"), or thermoplastic olefin ("TPO"). In some embodiments, the packaging material comprises sheets of laminating film between which the insert film is placed, and "packaged" refers to encapsulation of the insert film by the sheets of laminating film; i.e., the sheets of laminating film cover the edges and both sides of the insert film except for, in certain embodiments, electrical leads (see, e.g., the embodiment of FIG. 11). In some other embodiments in which the insert film is positioned between sheets of laminating film that act as the packaging material, "packaged" refers to coverage of both sides, but not the edges, of the insert film by the sheets of laminating film (see, e.g., the embodiment of FIG. 4). In still other embodiments, "packaged" refers to using the packaging material to form a frame that circumscribes the periphery of the insert film (see, e.g., the embodiment of FIG. 9). In the depicted embodiments, the insert film is attached, directly or indirectly, to at least a portion of the packaging material.

The packaged film assembly is then delivered to a laminator who may proceed to laminate it between two substrates without having to cut multiple sheets of interlayer and without having to align the insert film and interlayers in the manner required during conventional multilayer lamination. Using the packaged film assembly as described herein accordingly simplifies the lamination process for the laminator, facilitating increased productivity. Examples of the substrates to which the interlayer and insert film are laminated include glass and polymer (e.g., polycarbonate), and in certain embodiments one of the substrates may be manufactured using one type of material and the other of the substrates may be manufactured using a different type of material. In one example embodiment, one or both of the substrates comprise a glass-plastics pane, which is a pane of laminated glass comprising one layer of glass and one or more layers of plastics material of which at least one acts as an interlayer.

While in the depicted embodiments the insert film comprises PET, in different embodiments (not depicted) the insert film may additionally or alternatively comprise one or more different thermoplastic polymers. For example, the insert film may additionally or alternatively comprise any one or more of polyethene ("PE"), polypropylene ("PP"), polybutylene terephthalate ("PBT"), polyethylene napththalate ("PEN"), polycarbonate ("PC"), and other engineering thermoplastics.

In the depicted embodiments, the insert film is a switchable film that is non-opaque in both the dark and light states; however, in non-depicted embodiments the insert film may comprise a non-switchable film that is non-opaque or opaque, or it may comprise a switchable film that is non-opaque in one of the states (e.g., comprise switchable film comprising a liquid crystal that is non-opaque only in the light state). The switchable film may be fabricated using photochromic, thermochromic, photochromic/electrochromic, liquid crystal, or suspended particle technologies. Photochromic optical filters tend to automatically darken when exposed to sunlight, and lighten in the absence of sunlight. Electrochromic, liquid crystal, and suspended particle technologies however, tend to alternate between dark and light operating states (or transmissive states) in response to electricity. Thermochromic optical filters darken or lighten when exposed to a change of temperature. Electrochromic optical filters, for example, tend to darken when a voltage differential is applied across a pair of terminals electrically coupled to different sides of the electrochromic material, and tend to lighten when the polarity of the voltage differential is reversed.

In the embodiments depicted herein, the switchable film is based on a hybrid photochromic/electrochromic technology, which darkens in response to sunlight, UV, or other particular wavelengths of electromagnetic radiation (hereinafter "light") and lightens or becomes transparent (hereinafter "lighten") in response to a non-zero voltage (hereinafter "voltage") applied across the electrical leads connected to the switchable film. The switchable film comprises a switching material having one or more chromophores that are reversibly convertible between colored (dark) and uncolored (light) states; the switching material may further comprise a solvent portion, polymer(s) (such as PET), salts, or other components to support the conversion of the chromophore between colored and uncolored states when exposed to light or voltage. Some examples of chromophores include fulgides, diarylethenes or dithienylcyclopentenes. However, in different embodiments (not depicted), other types of optical filters comprising alternate switching materials with similar behavior to hybrid photochromic/electrochromic switching materials, may also be employed. Examples of various optical filters and their underlying chemistries may be found in U.S. Pat. No. 8,441,707, the entirety of which is hereby incorporated by reference.

Figure 2:
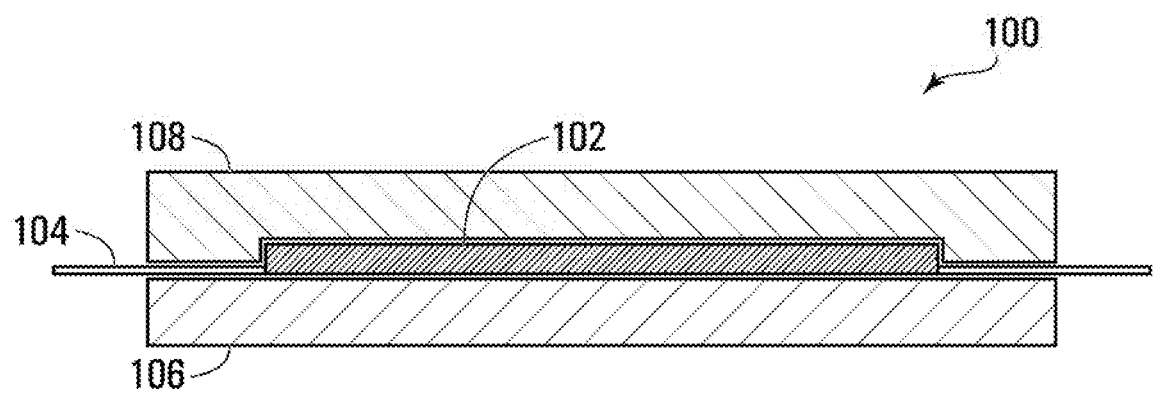
FIGS. 2 to 7, 9, 11, and 12 depicted various example embodiments of a packaged film assembly.

Referring now to FIG. 2, there is shown a packaged film assembly 100, according to one embodiment. The assembly 100 comprises a first film 106 comprising a PVB film that is 0.76 mm or 0.38 mm thick. A switchable film 102 is laid down on to the first film 106 so that the switchable film 102 is spaced from all the edges of the first film 106; that is, the first film 106 circumscribes the border of the switchable film 102 when looking down at the switchable film 102 laid on the first film 106. In one example embodiment, the switchable film 102 is 0.46 mm thick; additionally or alternatively, in certain embodiments the border formed by the first film 106 around the switchable film 102 is anywhere from a few millimeters to several centimeters or tens of centimeters wide. The switchable film 102 comprises two PET layers and a switching material between the two PET layers; each of the PET layers is coated with a conductive coating, and the PET layers are electrically connected to at least a pair of electrical leads 104.

A second film 108 is then formed over the top of the first film 106 and switchable film 102 by casting a solution over the first and switchable films 106,102 that is allowed to dry. The solution is formed by dissolving a sheet of PVB that is suitable for use as an interlayer or by dissolving a resin formulation comprising, for example, PVB resin compound made up of PVB resin, a high boiling point plasticizer, and other additives such as UV absorbers or antioxidants, in a suitable low boiling point solvent that is a non-solvent for the PET comprising the switchable film 102; here, being a "non-solvent" for PET means that the solvent does not swell PET. A suitable solvent is, for example an alcohol such as IPA (isopropanol), hydrocarbon such as toluene, ether such as THF (tetrahydrafuran), or mixture of solvents. As shown in FIG. 2, once dry the switchable film 102 is encapsulated by the first and second films 106,108, with only the electrical leads 104 extending beyond the edges of the films 106,108.

As in FIG. 2, the embodiments depicted in FIGS. 3 to 13 the switchable film 102 comprises PET and each of the first and second films 106,108 comprises PVB. However, as described above, in different embodiments (not depicted) the films 102, 106, 108 may have different compositions. In certain embodiments, the films 106, 108 and, in particular, PVB are translucent prior to lamination, at which time they become transparent.

Figure 3:
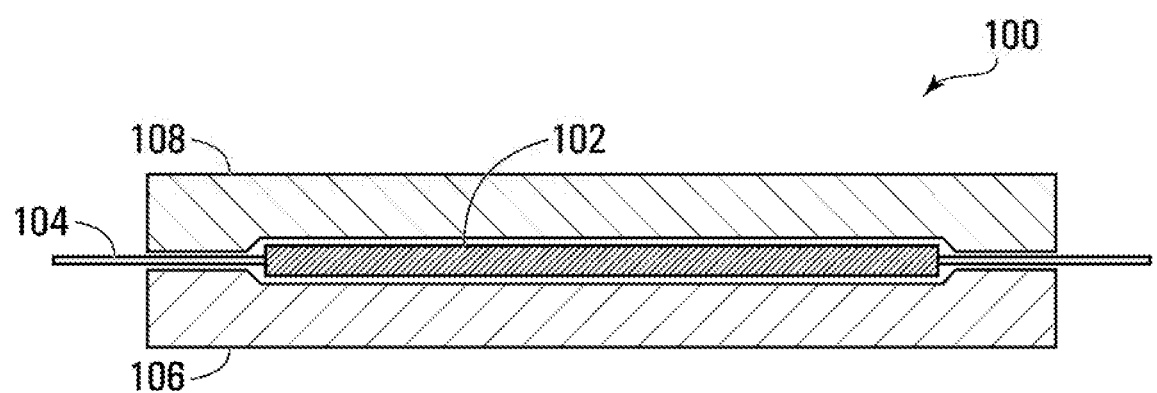

Referring now to FIG. 3, there is shown another example embodiment of the encapsulated switchable film assembly 100. Similar to the embodiment of FIG. 2, the first film 106 is laid on a surface, the switchable film 102 and electrical leads 104 are laid on the first film 106, and the second film 108 is then laid on the switchable film 102 and first film 106. The switchable film 102 is positioned relative to the first and second films 106,108 such that it is spaced from all the edges of those films 106,108; this permits the peripheries of the first and second films 106,108 to directly contact each other, except where prevented by the electrical leads 104.

After laying the films 106, 102, 108, they are secured or attached together to facilitate shipping of the assembly 100 to a laminator. For example, the films 106, 102, 108 may be secured or attached to each other using an adhesive (e.g., one or both of pressure sensitive and low-tack adhesive, tape, and spray adhesive). Additionally or alternatively, localized heat may be applied to overlapping portions of the films 106,108 to cause them to flow and bond together at those overlapping portions; the localized heat in the depicted embodiments exceeds PVB's glass transition temperature, but is below PVB's melting temperature. For example, the localized heat may be applied continuously along the films 106,108 such that the switchable film 102 is circumscribed by a loop of bonded PVB; alternatively, the localized heat may be applied at discrete regions of overlapping portions of the films 106,108 such that the films 106,108 are adhered to each other at discrete regions of bonded PVB; using heat in this manner to secure or attach the films 106,108 together is referred to as "tacking" in this disclosure. Additionally or alternatively, the films 106, 102, 108 may be compressed using a press (e.g., rollers), as discussed in more detail in respect of FIG. 14 below. When the press is used, release liners or materials that help to ensure that the first and second films 106,108 do not adhere to the surface of the press are used as appropriate. Additionally or alternatively, the films 106, 102, 108 may comprise mechanical interlocking features that permit the first and second films 106,108 to directly interlock with each other, or that permit each of the first and second films 106,108 to directly interlock with the switchable film 102.

In certain embodiments, the laminated films formed using the packaged film assembly 100 may be designed and tested to pass various tests for laminated glass such as ANSI Z26.1-1996, ANSI Z26.1-2006, and ECE R43.

In FIG. 3, each of the films 106,108 is identical and has a thickness of 0.38 mm, although in different embodiments (not depicted) the films 106,108 may differ in one or more dimensions from each other and be of different thicknesses. Similarly, in FIG. 3 the switchable film 102 has a thickness of approximately 0.25 mm, although in different embodiments (not depicted) it may have a different thickness.

Figure 4:
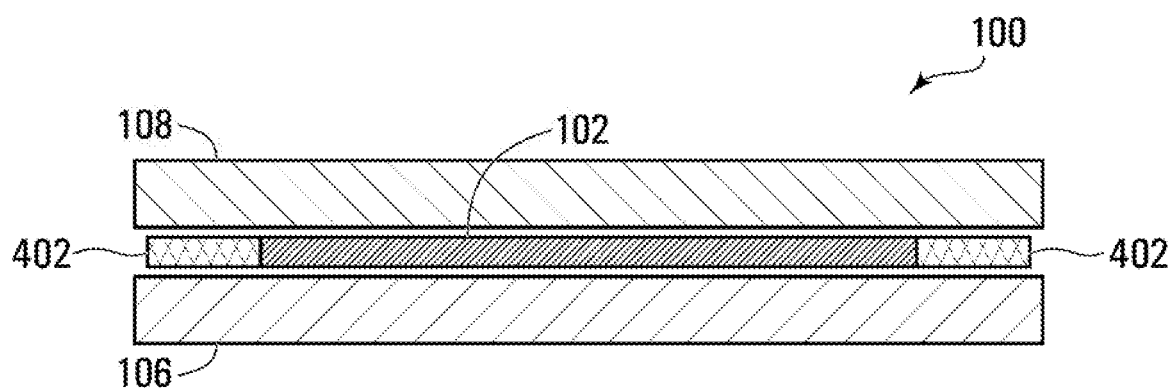

FIG. 4 shows an embodiment of the packaged film assembly 100 in which the switchable film 102 is packaged between the first and second films 106,108, and in which the first and second films 106,108 have the same or slightly larger width and height than the switchable film 102. For example, in one embodiment each of the first and second films 106,108 has a width and height that is approximately 1 cm greater than the width and height of the switchable film 102, respectively; in different embodiments, one or both of the first and second films 106,108 may have a width and/or height that is approximately 0.1 cm, 0.2 cm, 0.3 cm, 0.4 cm, 0.5 cm, 0.6 cm, 0.7 cm, 0.8 cm, or 0.9 cm greater than the width and/or height of the switchable film 102. A moisture barrier or seal may be located in the edge region between the first and second films 106,108 through which the switchable film 102 does not extend. In FIG. 4, a zone of relatively high adhesion ("high adhesion zone") 402 is along the periphery of the switchable film 102 to edge seal the assembly 100. An epoxy, for example, may be used as an adhesive to create the high adhesion zone within the switchable film 102. The switchable film 102 is then secured or attached to the first and second films 106,108 such that the position of the switchable film 102 is stable relative to the first and second films 106,108. In certain embodiments this is achieved using an additional or temporary adhesive layer. Additionally or alternatively, tacking may be used to secure or attach the films 102, 106, 108 together. The assembly 100 is subsequently laminated and may then be sent to laminators for further lamination between glass using conventional single interlayer lamination techniques, as is done with the embodiment of FIG. 3.

Figure 5:
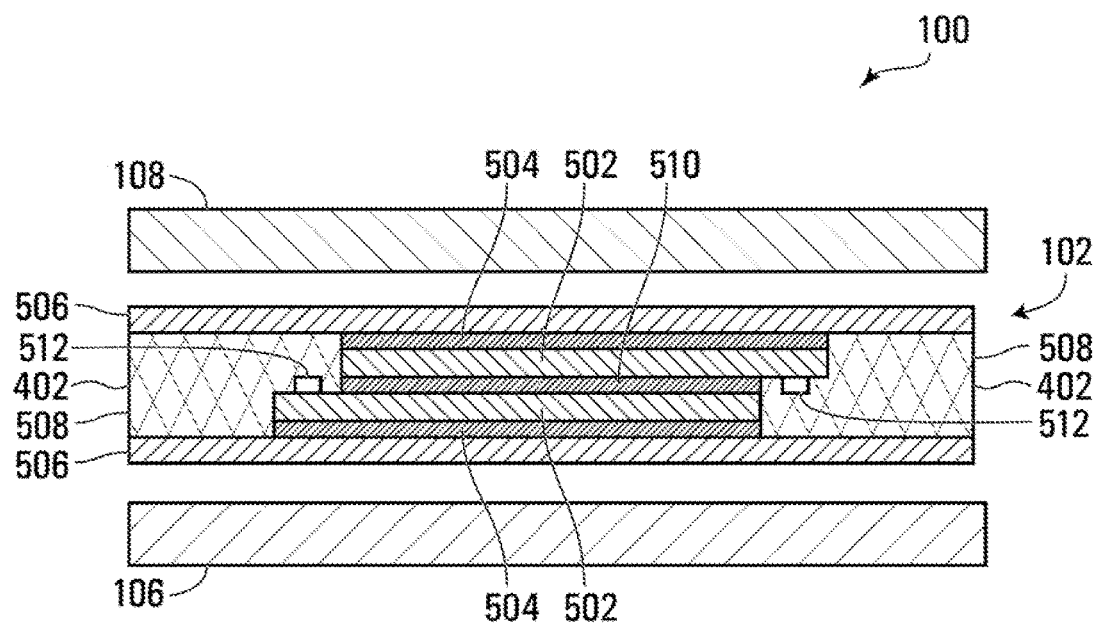

Referring now to FIG. 5, there is shown another embodiment of the packaged film assembly 100. In FIG. 5, the switchable film 102 is again located between the first and second films 106,108. The switchable film 102 comprises a pair of PET coverlays 506 that each has approximately the same width and height than the films 106,108. The films 106,108 are tacked or otherwise secured or attached to the coverlays 506. In a different embodiment, one or both of the coverlays 506 has a slightly smaller width and/or height (e.g., approximately 1 cm smaller in one or both of width and height) than the films 106,108.

A pair of transparent, conductive electrodes in the form of indium tin oxide ("ITO")-coated PETs 502 are adhered to the PET coverlays 506 using pressure sensitive adhesive 502. Each of the ITO-coated PETs 502 is adhered to one of the coverlays 506. The ITO-coated PETs 502 are positioned to face and to substantially overlap each other, with a portion of each of the ITO-coated PETs 502 extending past the edge of the other. The PET coverlays 506 have a greater surface area than the ITO-coated PETs 502, and each of the ITO-coated PETs 502 is positioned on the PET coverlays 506 such that it is spaced from all the edges of the PET coverlay 506 to which it is adhered. A bus bar 512 is secured to the overhanging portion of each of the ITO-coated PETs 502 and a switching material 510 is located between the overlapping portions of the ITO-coated PETs 502. An epoxy 508 fills the space between the PET coverlays 506 that is not occupied by the switching material 510, ITO-coated PETs 502, bus bars 512, and pressure sensitive adhesive 502. The epoxy 508 has good adhesion to the PET coverlays 506 and consequently provides a high adhesion zone 402 that helps to hold the assembly 100 together and acts as an edge seal.

The first and second films 106,108 may be tacked or otherwise bonded as described above in respect of FIG. 3 to the switchable film 102 after the switchable film 102 has been entirely assembled.

Figure 6:
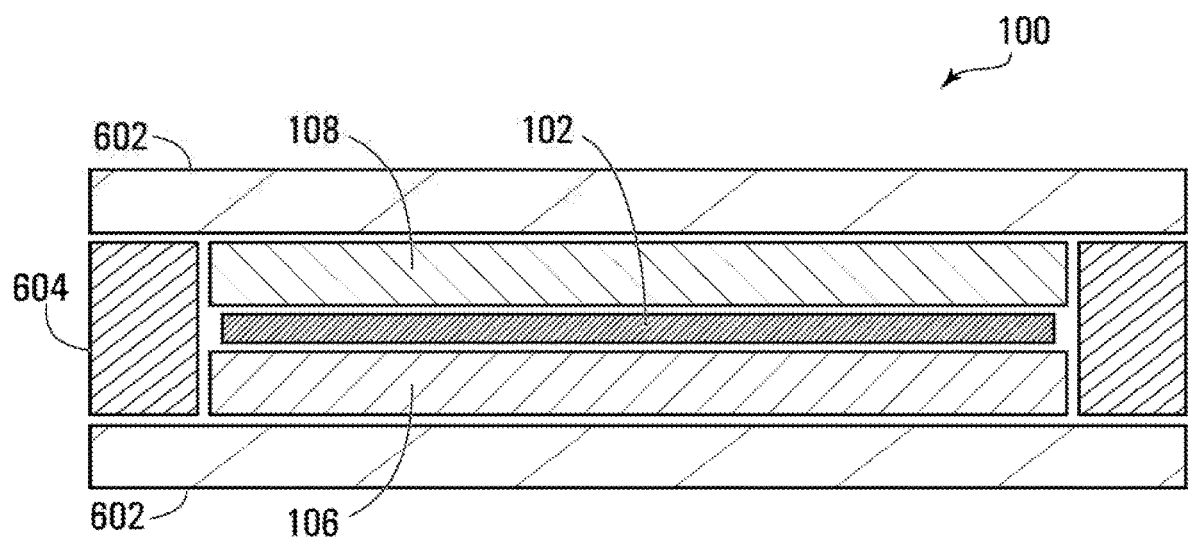

Referring now to FIG. 6, there is shown another example embodiment of the assembly 100. In the embodiment of FIG. 6, the first and second films 106,108 have approximately the same dimensions as, or slightly larger dimensions than, the switchable film 102, which is located between the films 106,108. The films 106,108 are sandwiched between two glass panes 602, with the second film 108 spaced from all the edges of the upper glass pane 602 in FIG. 6 and the first film 108 spaced from all the edges of the lower glass pane 602 in FIG. 6. A bonding material 604 that is approximately the same thickness as the combined thicknesses of the films 102, 106, 108 is also sandwiched between the glass panes 602 and circumscribes the films 102, 106, 108, which comprises the area to be laminated. The bonding material 604 may be any suitable material such as PVB or PVS 101 made by Royal Adhesives and Sealants' of Michigan Centre, Mich. Certain bonding materials such as PVS 101 may also act as good sealants against oxygen and moisture.

In contrast to the embodiments above, the bonding material 604 bonds directly to the glass panes 602 as opposed to the films 106,108 bonding only each other or the switchable film 102, as in FIGS. 4 and 5. The assembly 100 that is shipped to the laminator may comprise the bonding material 604 and the films 106, 102, 108, with the bonding material 604 and films 106, 102, 108 being secured or attached together using tape.

Figure 7:
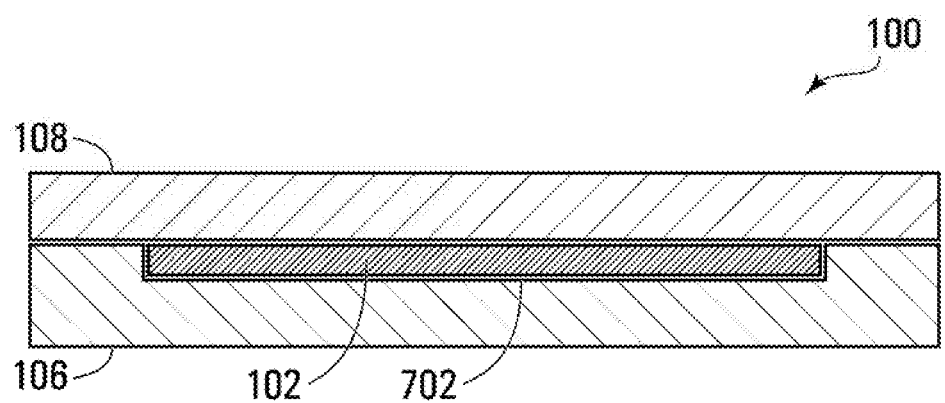

FIG. 7 shows an embodiment of the encapsulated switchable film assembly 100 in which the first film 106 is manufactured by extruding PVB in a film that comprises a groove 702 shaped to receive the switchable film 102. After the first film 106 sufficiently cools, the switchable film 102 is placed in the groove 702 and extruded strips of PVB are placed to abut against the ends of the groove 702 so that the switchable film 102 is framed on all edges by PVB. The second film 108 is placed over the first and switchable films 106,102 and the PVB portions that abut against the groove's 702 ends. The first and second films 106,108 and those PVB portions are then tacked together and sent to a laminator for lamination between glass. By virtue of being extruded, the groove 702 is shaped as a channel and has straight edges; consequently, for a close fit between the switchable film 102 and the edges of the groove 702, the switchable film 102 in the depicted embodiment has straight edges as well. In different embodiments, the switchable film 102 may be differently shaped. Surface roughness can be imparted on the surface of one or both of the films 106,108 either as part of the extrusion process or after the extrusion process. The surface roughness may help with de-airing during subsequent lamination. In at least some example embodiments, surface roughness may be 15-25 μm (600-1,000 μinches), random in terms of amplitude variability and/or spatial frequency, or both.

Figure 8A:
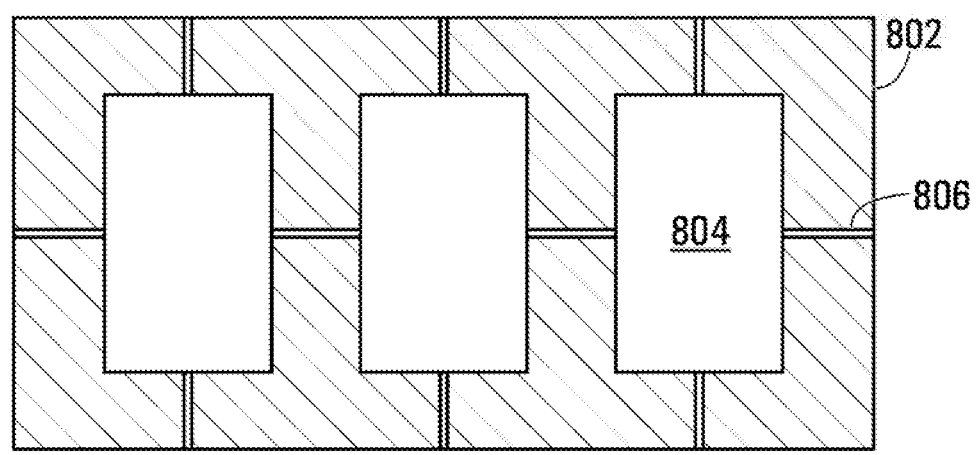
FIG. 8A depicts a PVB frame that comprises part of one example embodiment of the packaged film assembly.
Figure 8B:
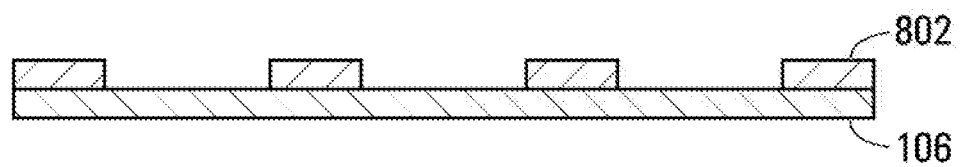
FIG. 8B depicts a sectional view of the frame of FIG. 8A overlaid on a PVB sheet.

FIGS. 8A and 8B depict frames 802 that may be used in various embodiments of the packaged film assembly 100. FIG. 8A depicts an example frame 802 that comprises a PVB film in which are cut apertures 804. Each of the apertures 804 is shaped to receive one switchable film 102, and extending perpendicularly from the edges of each of the apertures 804 towards the edges of the frame 802 are de-airing channels 806 that may assist with de-airing during lamination. The frame 802 shown in FIG. 8A may be laminated to multiple panes of glass; for example, the frame 802 may be cut to separate the apertures 804 and each of the apertures 804 may be used in a packaged film assembly 100 that is used in a sunroof.

To manufacture the packaged switchable film assembly 100 using the frame 802, the first film 106 is first laid on a surface and the frame 802 is laid on the first film 106; FIG. 8B is a sectional view of the frame 802 looking lengthwise along the apertures 804 when laid on the first film 106. One of the switchable films 102 (not depicted in FIG. 8B) is put in each of the apertures 804 that is backed by the first film 106, and the second film 108 (not depicted in FIG. 8B) is then laid over the frame 802. The second film 108 may be secured or attached to the frame 802 (e.g., using an adhesive or localized heat, as described above for FIG. 3) to form the assembly 100. In different embodiments (not depicted), the first and second films 106,108 may be directly bonded to each other around the frame 802.

Figure 9:
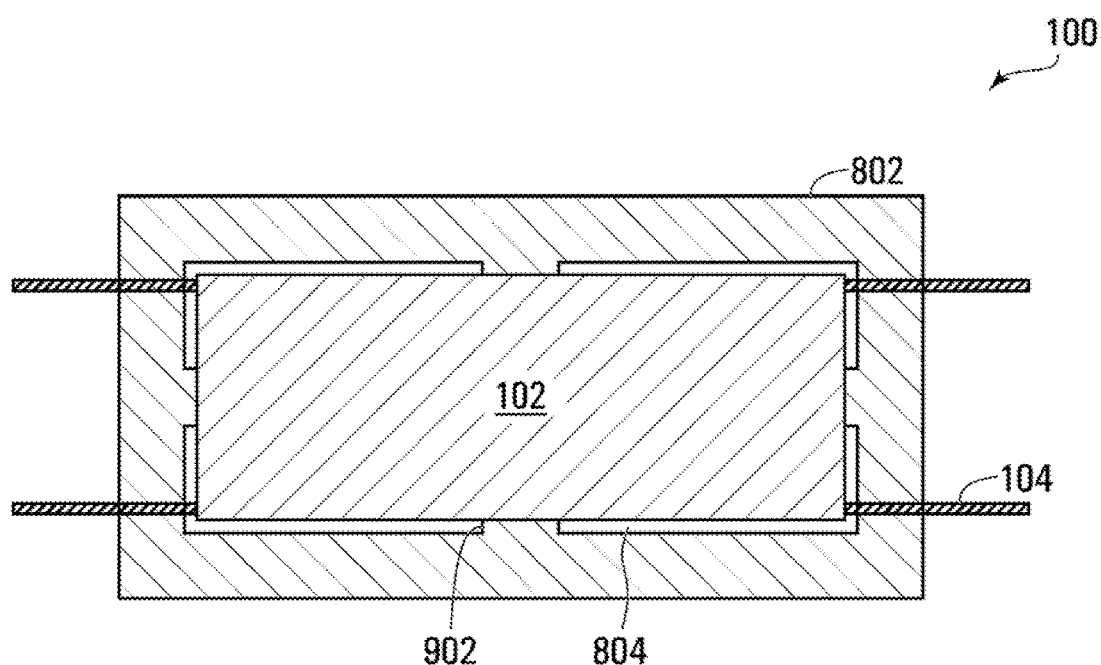

Referring now to FIG. 9, there is shown another embodiment of the packaged film assembly 100 comprising the frame 802 and the switchable film 102. In FIG. 9, the aperture 804 in the frame 802 comprises four inwardly extending tabs 902 that attach to the switchable film 102 located within the aperture 804. As discussed above in respect of FIG. 3, the tabs 902 may be secured or attached to the switchable film 102 using any suitable means such as adhesive, tape, localized heat to form a tack weld, a mechanical rivet, and mechanical interlocking features in the film 102 and frame 802. FIG. 9 also shows the electrical leads 104 connected to the switchable film 102 and extending past the periphery of the frame 802. Following manufacture, the assembly 100 is sent to a laminator who cuts the first and second films 106,108, places the assembly 100 between them, and laminates the films 106,108 and assembly 100 to glass.

In the depicted embodiments of the assembly 100 comprising the frame 802, the frame 802 and the first and second films 106,108 all comprise PVB. However, in different embodiments, the frame 802 and films 106,108 may have different compositions; for example, the frame may comprise a material that does not laminate (e.g., PET or a rigid substrate), or may comprise a material that does laminate but that nonetheless differs in composition from the films 106, 108. Additionally, while in the depicted embodiments the frame 802 and the switchable film 102 are approximately the same thickness, in different embodiments, such as those in which the frame 802 is manufactured using a compliant material such as PVB, they may have different thicknesses. In the depicted embodiments in which the switchable film 102 comprises PET and the frame 802 comprises PVB, the film 102 may be 18 mil thick and the frame 802 may be 15 mil thick. Additionally, while the frame 802 is shown in FIG. 9 as circumscribing the entire switchable film 102, in different embodiments the entire switchable film 102 need not be circumscribed. For example, as shown in FIG. 8A, portions of the frame 802 may comprise the de-airing channels 806. In different, non-depicted embodiments, a greater proportion of the switchable film 102 may not be circumscribed by the frame 802.

Figure 10:
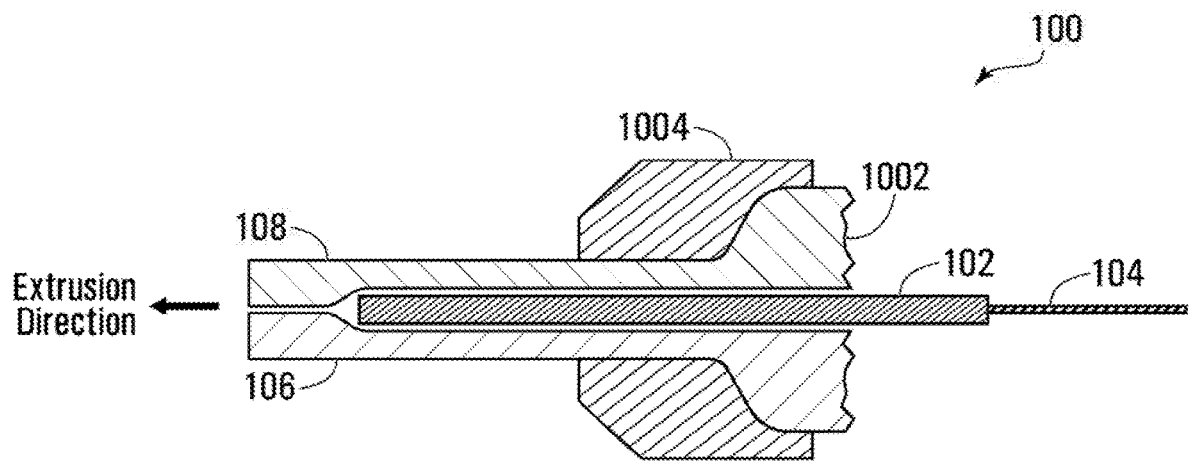
FIG. 10 depicts an example embodiment of the packaged film assembly being manufactured using extrusion.

FIG. 10 depicts an example method for manufacturing the packaged film assembly 100. Molten or softened PVB is stored in a PVB reservoir 1002 that is pushed through the lips of an extrusion die 1004 simultaneously with the switchable film 102. PVB films accordingly are deposited on the bottom and top of the switchable film 102, which once dry are the first and second films 106,108. Surface roughness can be imparted to the surface of substrates 108 and 106 either during the extrusion process or afterwards in order to help with de-airing during the lamination process. In at least some example embodiments, surface roughness may be 15-25 μm (600-1,000 μinches), random in terms of amplitude variability and/or spatial frequency, or both. The electrical leads 104 extend from a rear end of the switchable film 102 that is not pushed through the die 1004 to protect the leads 104 from being damaged. In some embodiments, the switchable film 102 is selected to have dimensions such that the extruded PVB covers its edges, thereby entirely encapsulating it. In different embodiments in which the switchable film 102 is not entirely encapsulated, one or both of the film's width and height are long enough so at least one edge of the film 102 is not encapsulated by the PVB. In these embodiments, the film 102 may extend to the edge of the PVB (e.g., FIG. 4); additionally or alternatively, an additional material such as the bonding material 604 of FIG. 6 may be used to frame the film 102.

Figure 11:
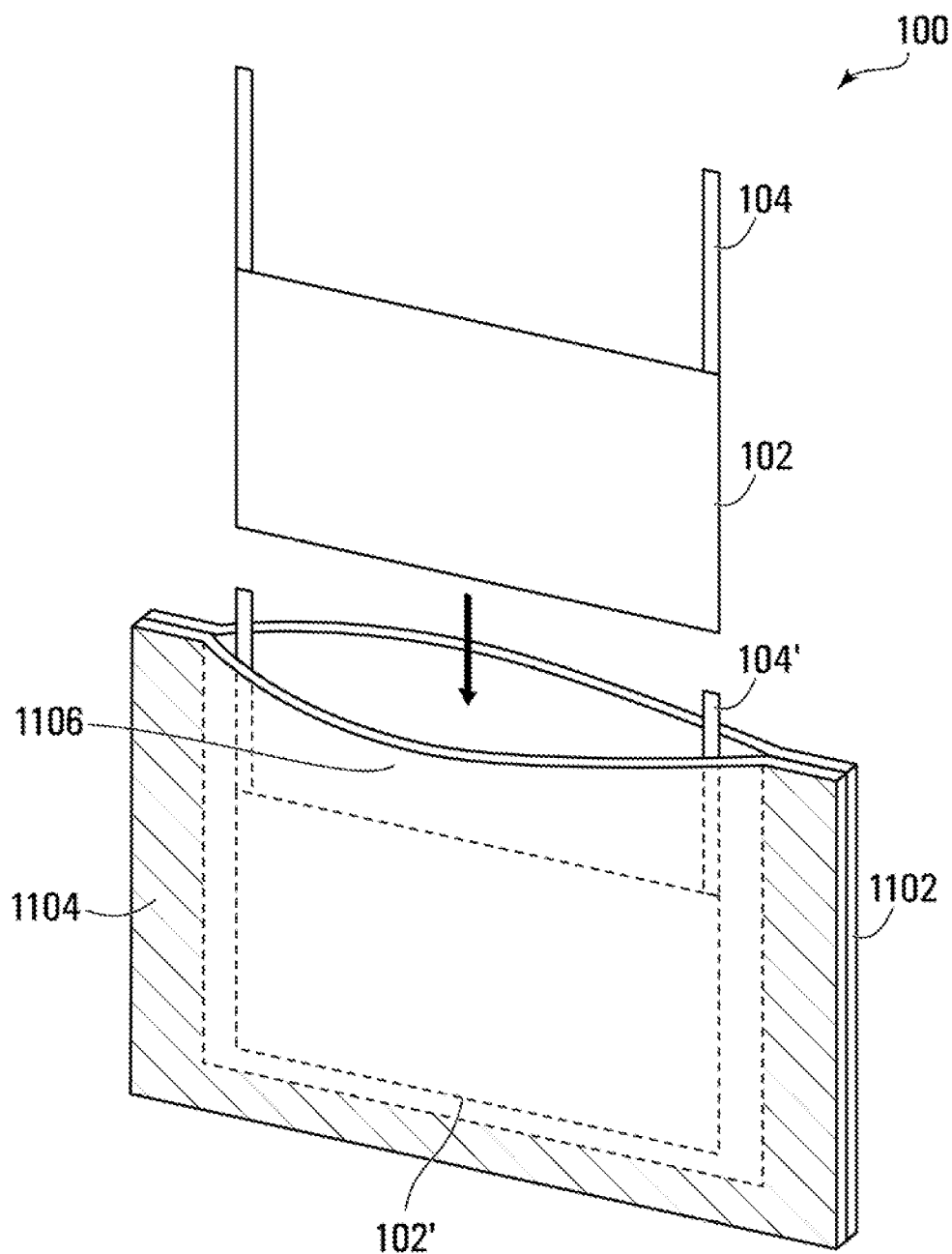

FIG. 11 depicts another embodiment of the packaged film assembly 100 comprising a pouch 1102 comprising the first and second films 106,108 having dimensions appropriate for the substrates to which they will eventually be laminated. In FIG. 11, the pouch 1102 comprises PVB and is formed by overlaying the first and second films 106,108 and then attaching three of the edges of the first and second films 106,108 together to form an attached PVB portion 1104. One edge of the pouch 1102 comprises a sealable pouch opening 1106 that is initially left open. The switchable film 102 and electrical leads 104 are inserted into the pouch 1102 through the opening 1106, following which the opening is closed similar to how the attached PVB portion 1104 is closed while still permitting the electrical leads 104 to protrude therefrom. In FIG. 11, the position of the switchable film 102 and electrical leads 104 after they are secured in the pouch 1102 is shown in dashed lines and labeled as 102' and 104', respectively. The pouch 1102 once assembled may then be placed between glass and laminated by a laminator using conventional lamination procedures. The switchable film 102 is secured or attached to the first and second films 106,108 once contained within the pouch 1102 notwithstanding that the switchable film 102 may be movable within the pouch 1102.

In one different embodiment (not depicted), the sealable pouch opening 1106 is not closed but instead is left unsealed; in this embodiment, friction retains the switchable film 102 within the pouch 1102.

Additionally, while in FIG. 11 the first and second films 106,108 are fused together to form the fused PVB portion 1104 and consequently form the pouch 1102, in a different embodiment (not depicted) an extra layer of PVB may be used to seal the periphery of the first and second films 106,108 to form the fused PVB portion 1104.

Figure 12:
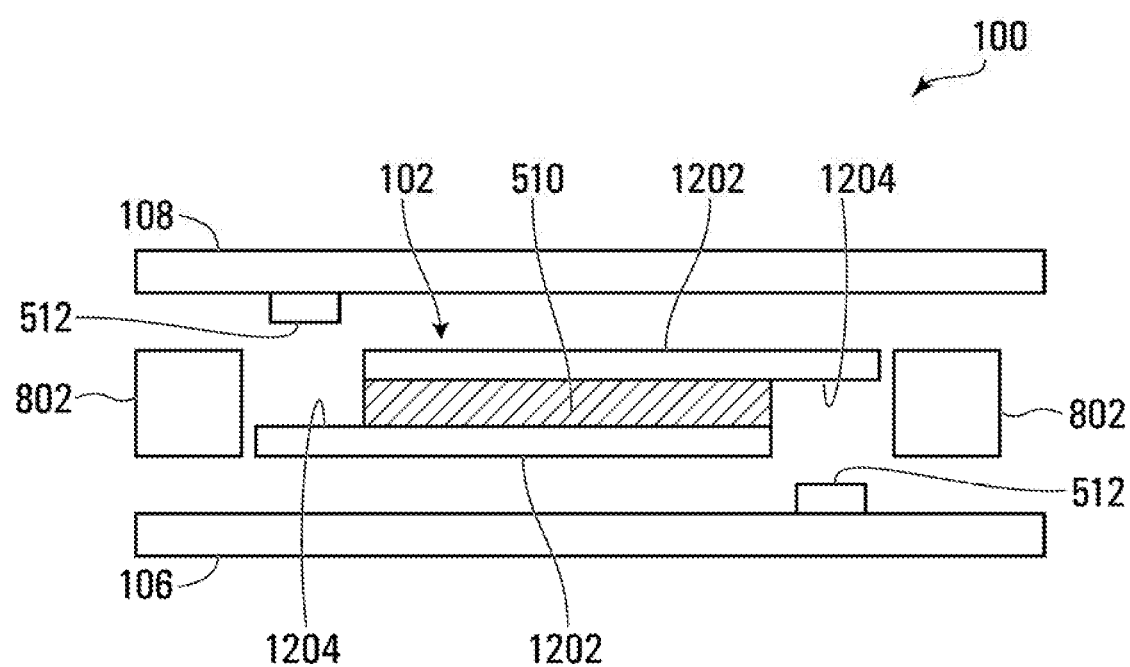

FIG. 12 depicts another embodiment of the packaged film assembly 100 in which the bus bars 512 are embedded directly into the PVB that comprises the first and second films 106,108. The assembly 100 of FIG. 12 comprises the PVB frame 802 located between and along the periphery of the first and second films 106,108. Two PET substrates 1202 with an electrically conductive coating 1204 act as electrodes and are positioned in the aperture 804 that the frame 802 defines and face and substantially overlap each other, and a portion of each of the PET coverlays 506 extends past the edge of the other. The switching material 510 is located between the overlapping portions of the PET substrates 1202. When assembled, one of the PET substrates 1202 is secured or attached to the first film 106 and the other of the substrates 1202 is secured or attached to the second film 108. One bus bar 512 is embedded into the second film 108 such that it contacts the electrically conductive coating 1204 of the PET substrate 1202 secured or attached to the first film 106 and another bus bar 512 is embedded into the first film 106 such that it contacts the electrically conductive coating 1204 of the PET substrate 1202 secured or attached to the second film 108.

During lamination, the bus bars 512 bond to the conductive coatings 1204 on the PET coverlays 506 with which they are in contact, thereby forming the electrical connections to the switchable film 102. Manufacturing the assembly 100 in this manner may simplify the forming of the switchable film 102.

Other features and components may also be incorporated into the first and second films 106,108. For example, one or both of the films 106,108 may contain colored pigments or dyes to form a colored filter that facilitates different colors or transmittance levels once the assembly 100 is laminated to glass. Additionally or alternatively, one or both of the films 106,108 may comprise ultraviolet light blocking features that block ultraviolet light, which can help to extend the lifetime of the switchable film 102. Additionally or alternatively, pigments or dyes may be incorporated into one or both of the PET or other thermoplastic that comprises the switchable film 102, and into the substrates to which the assembly 100 is laminated.

Figure 14:
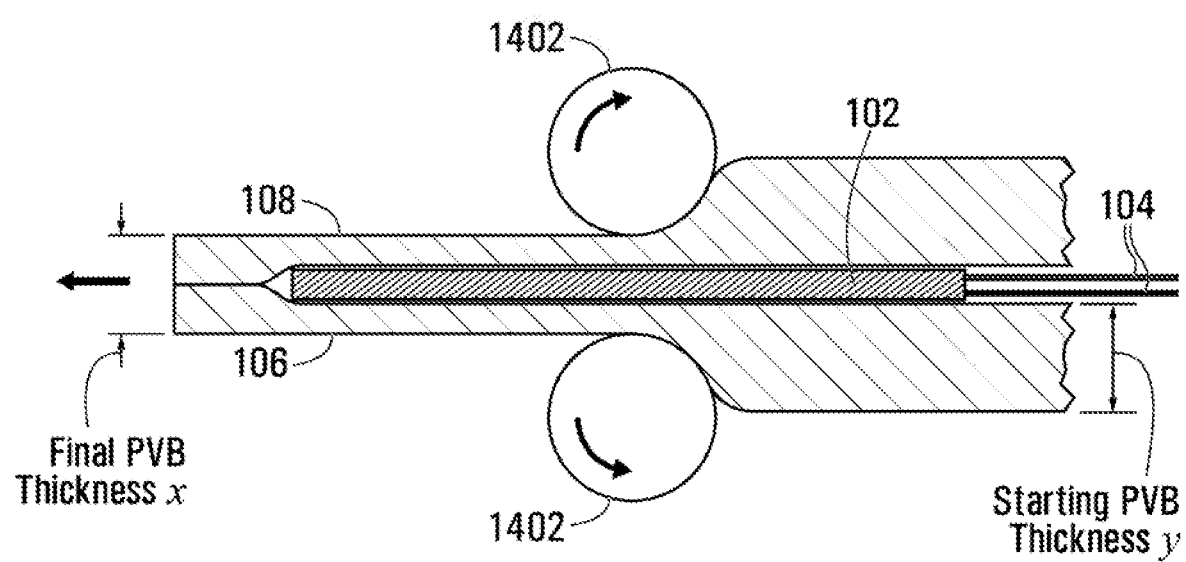
FIG. 14 depicts an example embodiment of the packaged film assembly being manufactured using calendaring.

FIG. 14 depicts an example embodiment of the packaged film assembly 100 being manufactured using calendaring and, more particularly, using two calendaring rollers 1402. The calendaring rollers 1402 may be heated in order to help flow the PVB comprising the first and second films 106,108 and form it to the desired thickness. The switchable film 102 between the first and second films 106,108 are fed through the calendaring rollers 1402. The gap labeled "x" in FIG. 14 between the rollers 1402 is set at the final thickness desired for the packaged film assembly 100. The calendaring rollers 1402 squeeze the PVB from an initial thickness labeled "y" in FIG. 14. The switchable film 102 is only minimally compressed by the calendaring process. In one example embodiment, the PVB is fed through the calendaring rollers 1402 in advance of the switchable film 102 so that the switchable film 102 may be encapsulated by fusing the PVB together in front of it. In this example embodiment the final thickness "x" is set less than "y/2" so the PVB is forced together even without the switchable film 102. At the point at which the switchable film 102 starts going through the calendering rollers 1402, the PVB is pressed even thinner by the rollers 1402. In certain embodiments heat may be used to help with forming the PVB and to fuse it together on the leading edge. At the tailing edge and along the sides (not shown) of the first and second films 106,108, the PVB in certain embodiments also overhangs the switchable film 102 so the first and second films 106,108 fully encapsulate the switchable film 102. In the depicted embodiment, the electrical leads 104 are shown exiting from the back of the assembly 100, but in non-depicted embodiments they may also exit from the side or from the front of the assembly 100. The outer, curved surfaces of the calendering rollers 1402 may be textured so they impart surface roughness to exterior surfaces of the first and second films 106,108; this texture may help with the de-airing process during any subsequent lamination. In at least some example embodiments, surface roughness may be 15-25 μm (600-1,000 μinches), random in terms of amplitude variability and/or spatial frequency, or both. The calendaring process can be done on a part-by-part batch process, or in a continuous process with many parts running through one after another. In certain embodiments, the rollers 1402 may be sufficiently heated such that the assembly 100 has sufficient structural integrity by virtue of heating and pressure alone; in different embodiments, other mechanisms such as an adhesive may additionally or alternatively be used to maintain the integrity of the assembly 100. Additionally, in certain non-depicted embodiments, one or more additional rollers may be positioned to impart surface texture to one or both of the films 106,108 once they exit the rollers 1402.

Figure 13:
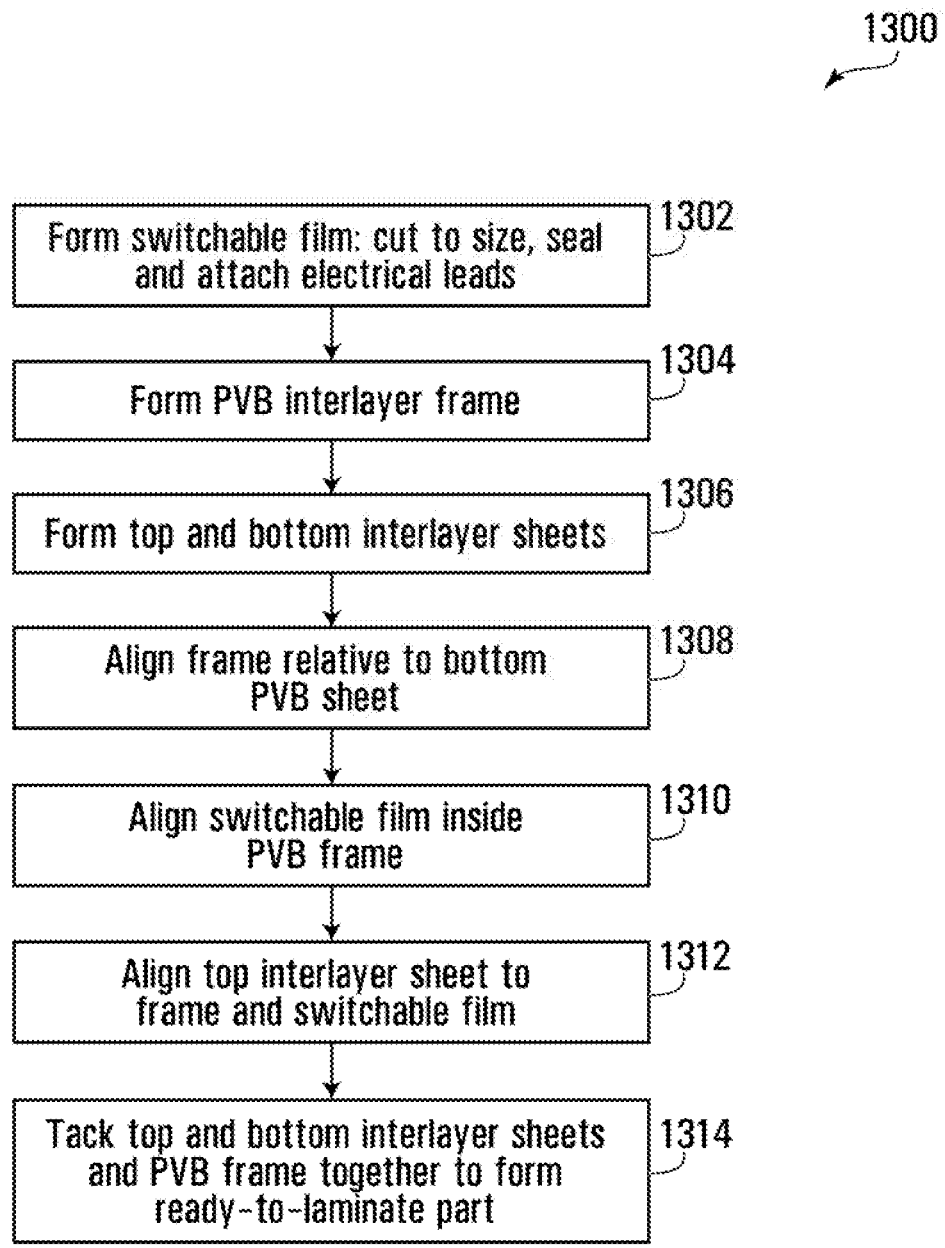
FIG. 13 depicts an example embodiment of a method for manufacturing the packaged film assembly.

Referring now to FIG. 13, there is shown an example method 1300 for manufacturing the packaged film assembly 100, according to another embodiment. The method 1300 begins at block 1302 where the switchable film 102 is formed by cutting it to size, sealing it, and attaching the electrical leads 104 to it. The frame 802 is formed at block 1304 as described, for example, in respect of FIG. 8. At block 1306 the first and second sheets 104,106 are formed and at block 1308 the frame 802 is aligned relative to the first sheet 104, which in this embodiment is laid on a surface first and is consequently the bottom sheet. At block 1310 the switchable film 102 is aligned within the frame 802, and at block 1312 the second film 108 is laid on the frame 802 and switchable film 102. At block 1314 the first and second films 106,108 are tacked or otherwise attached together as described, for example, in FIG. 12, to complete manufacture of the packaged film assembly 100. A laminator may subsequently laminate the assembly 100 to appropriate substrates, such as glass panes for a window.

FIG. 13 is a flowchart of an example embodiment of a method. Some of the blocks illustrated in the flowchart may be performed in an order other than that which is described. Also, it should be appreciated that not all of the blocks described in the flowchart are required to be performed, that additional blocks may be added, and that some of the illustrated blocks may be substituted with other blocks.

The switchable film 102 in the depicted embodiments does not melt or flow at the temperatures used to laminate the first and second films 106,108. Similarly, in embodiments that comprise the PET coverlays 506 or PET substrates 1202, neither the coverlays 506 nor the substrates 1202 melt or flow at the temperatures used to laminate the first and second films 106,108. While in the depicted embodiments the switchable film 102, PET coverlays 506, and PET substrates 1202 all comprise PET and the films 106,108 comprise PVB, in certain other embodiments in which the films 102,106,108, coverlays 506, and substrates 1202 comprise different materials, the switchable film 102, coverlays, and substrates also do not melt or flow at the temperatures required to laminate the first and second films 106,108. For example, the melting temperatures of the materials comprising the switchable film 102, coverlays, and substrates may be higher than the temperature used for lamination. The glass transition temperatures of the materials can be lower or higher than the temperature used for laminating. In embodiments in which the first and second films 106,108 comprise PVB, the lamination temperature is typically between approximately 125° C. and 140° C.

As used herein, the terms "approximately" and "about" when used in conjunction with a value mean+/−10% of that value.

Directional terms such as "top", "bottom", "upwards", "downwards", "vertically", and "laterally" are used in this disclosure for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this disclosure are intended to include indirect and direct connections unless otherwise indicated. For example, if a first article is coupled to a second article, that coupling may be through a direct connection or through an indirect connection via another article. Furthermore, the singular forms "a", "an", and "the" as used in this disclosure are intended to include the plural forms as well, unless the context clearly indicates otherwise. Additionally, the term "and/or" when used in conjunction with a list of items means any one or more of the items of that list.

It is contemplated that any part of any aspect or embodiment discussed in this specification can be implemented or combined with any part of any other aspect or embodiment discussed in this specification.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A packaged film assembly, comprising:
   (a) a packaging material, comprising a first and a second interlayer; and
   (b) a switchable film, packaged in and attached to at least a portion of the packaging material, configured to switch between a dark state and a light state,
   wherein the first interlayer is laminable to a first substrate and in direct contact with a first side of the switchable film,
   wherein the second interlayer is laminable to a second substrate and in direct contact with a second side of the switchable film that is opposite to the first side,
   wherein the first and second interlayers overlap and are secured to each other at overlapping portions around the switchable film, and
   wherein the overlapping portions comprise discrete regions located around the switchable film.

2. The assembly of claim 1 wherein the packaging material comprises polyvinyl butyral ("PVB") or ethylene-vinyl acetetate ("EVA").

3. The assembly of claim 1 wherein the switchable film transitions from the light state to the dark state upon exposure to sunlight and from the dark state to the light state when a voltage is applied across the switchable film absent exposure of the switchable film to sunlight.

4. The assembly of claim 3 wherein the switchable film comprises polyethylene terephthalate ("PET").

5. The assembly of claim 1 wherein the overlapping portions circumscribe at least part of the switchable film.

6. The assembly of claim 5 wherein the overlapping portions circumscribe the entirety of the switchable film.

7. The assembly of claim 6 further comprising a bonding material in the overlapping portions which bond the first and second interlays to each other.

8. The assembly of claim 5 wherein the first and second interlayers are bonded to the switchable film along a periphery of the switchable film to form an edge seal.

9. The assembly of claim 1 wherein the switchable film comprises:
   (a) a pair of PET coverlays located between the first and second interlayers, wherein one of the PET coverlays is secured to the first interlayer and the other of the PET coverlays is secured to the second interlayer;
   (b) a pair of electrically conductive electrodes located between the PET coverlays, wherein one of the electrodes is secured to one of the PET coverlays and the other of the electrodes is secured to the other of the PET coverlays, and wherein each of the electrodes comprises an overhanging portion that extends past an edge of the other of the electrodes;
   (c) a pair of bus bars, wherein one of the bus bars is electrically coupled to the overhanging portion of one of the electrodes and the other of the bus bars is electrically coupled to the overhanging portion of the other of the electrodes;
   (d) a switching material located between the electrodes; and
   (e) an epoxy between and bonding the PET coverlays to each other.

10. The assembly of claim 9, wherein the switching material comprises one or more of: an electrochromic material, a photochromic material, a thermochromic material, a photochromic/electrochromic material, a liquid crystal material, or a suspended particle technology.

11. The assembly of claim 1 wherein the packaging material comprises a frame that extends around at least a portion of the switchable film.

12. The assembly of claim 11 wherein the packaging material circumscribes the entirety of the switchable film.

13. The assembly of claim 11 wherein the frame comprises de-airing channels extending from an interior edge to an exterior edge of the frame.

14. The assembly of claim 11 wherein the frame comprises tabs extending towards the switchable film, and wherein the switchable film is attached to the tabs.

15. The assembly of claim 1 further comprising:
   (a) a pair of bus bars located between the first and second interlayers, wherein one of the bus bars is attached to the first interlayer and the other of the bus bars is attached to the second interlayer;
   wherein the switchable film comprises:
      (i) a pair of PET substrates located between the first and second interlayers, wherein one of the PET substrates is secured to the first interlayer and the other of the PET substrates is secured to the second interlayer, and wherein each of the PET substrates comprises an overhanging portion that extends past an edge of the other of the PET substrates;
      (ii) a pair of electrical coatings located between the PET substrates, wherein one of the electrical coatings is on one of the PET substrates and the other of the electrical coatings is on the other of the PET substrates; and
      (iii) a switching material located between the electrical coatings.

16. The assembly of claim 15, wherein the switching material comprises one or more of: an electrochromic material, a photochromic material, a thermochromic material, a photochromic/electrochromic material, a liquid crystal material, or a suspended particle technology.

17. The packaged film assembly of claim 1 wherein the switchable film is non-opaque in one of the states.

18. The assembly of claim 1, wherein the discrete regions delimit a pouch that contains the switchable film.

19. A method for manufacturing a packaged film assembly, the method comprising:
(a) forming a packaging material, comprising a first and a second interlayer, wherein the first interlayer is laminable to a first substrate and in direct contact with a first side of the switchable film and wherein the second interlayer is laminable to a second substrate and in direct contact with a second side of the switchable film that is opposite to the first side;
(b) forming a switchable film, configured to switch between a dark state and a light state; and
(c) packaging the switchable film in the packaging material, wherein packaging the switchable film comprises attaching the switchable film to at least a portion of the packaging material,
wherein the first and second interlayers overlap and are secured to each other at overlapping portions around the switchable film, and
wherein the overlapping portions comprise discrete regions located around the switchable film.

20. The method of claim 19 wherein forming the packaging material comprises:
(a) forming a frame; and
(b) forming the first and second interlayers from a laminable material,
and wherein the method further comprises:
(c) laying the first interlayer on a flat surface;
(d) aligning the frame on the first interlayer;
(e) aligning the switchable film within the frame;
(f) aligning the second interlayer on the frame and the switchable film; and
(g) attaching each of the first and second interlayers to opposing sides of the frame.

21. The method of claim 19, wherein the switchable film is non-opaque in one of the states.

\* \* \* \* \*